Nov. 3, 1931.   P. ALVENES   1,830,252
TRANSMISSION GEARING
Filed Sept. 11, 1929
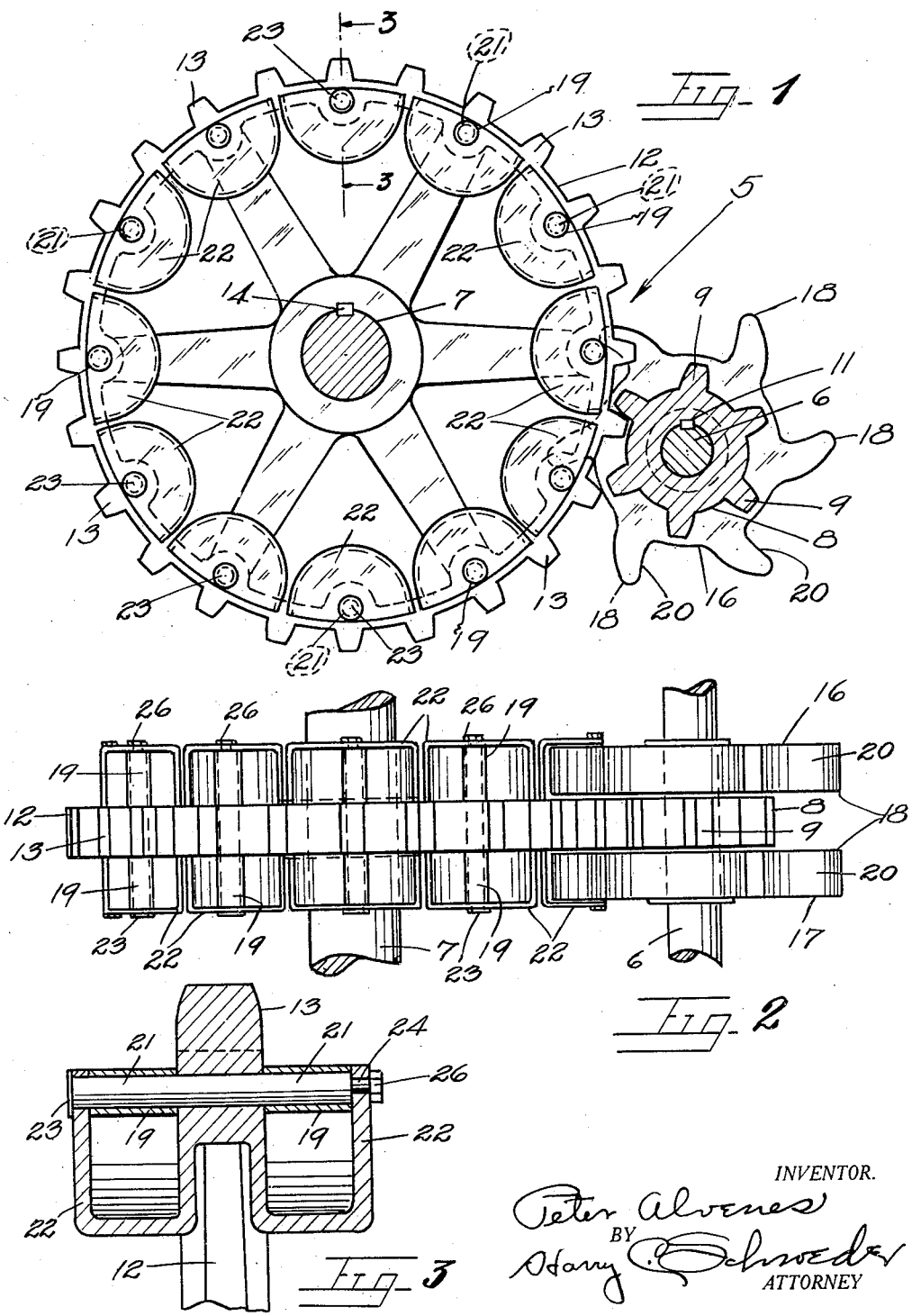

Patented Nov. 3, 1931

1,830,252

UNITED STATES PATENT OFFICE

PETER ALVENES, OF OAKLAND, CALIFORNIA

TRANSMISSION GEARING

Application filed September 11, 1929. Serial No. 391,822.

The invention forming the subject matter of this application relates to transmission gearing, and more specifically to heavy type of toothed transmission gearing that is particularly adapted for use in connection with heavy machinery.

An object of the invention is to provide a toothed transmission gearing wherein the frictional resistance of the meshed gears is reduced to a minimum, and wherein the engagement of the gears is rendered particularly strong and positive.

Another object of the invention is to provide a transmission gearing of the character set forth that will be superior in point of simplicity, inexpensiveness of construction, positiveness of operation, and facility and convenience in use and general efficiency.

With the foregoing and other objects in view, which will be made manifest in the following detailed description and specifically pointed out in the appended claims, reference is had to the accompanying drawings for the illustrative embodiment of the invention, wherein:

Fig. 1 is a side elevation of the transmission gearing forming the invention;

Fig. 2 is a plan view of the transmission gearing as shown in Fig. 1;

Fig. 3 is a detailed sectional view taken on the line 3—3 of Fig. 1 and shown on an enlarged scale.

Referring to the accompanying drawings wherein similar reference characters designate similar parts throughout, the various figures described above adequately illustrate my invention, and the following detailed description is commensurate with the above mentioned drawings in enabling an artisan to construct and assemble the constituent parts of the same.

The device involves in its general organization a transmission gearing designated as an entirety by the reference numeral 5 and comprises a drive shaft 6 and a driven shaft 7. Mounted on the drive shaft 6 is a relatively small driving gear 8 having teeth 9, which gear may be secured against rotation on said shaft by means of a key 11. The driven shaft 7 has mounted thereon a relatively large driven gear 12 provided with teeth 13, which teeth mesh with the teeth 9 of the driving gear 8 in the customary manner. Said gear 12 may also be secured against rotation on the driven shaft 7 by means of a key 14. From the foregoing it will be seen that the driving gear 8 meshing with the driven gear 12 provides the usual type of gear transmission means wherein a small gear denoted by the driving gear 6 is adapted to drive a large gear denoted by the driven gear 12. This construction, as has been stated, is of the usual type and provides nothing that differs from the common use of gear transmissions.

It has been found, however, that great strain is placed on the teeth 9 of the small driving gear 8 in driving a large gear such as the gear 12, and more especially when the load on the gear 12 is heavy. This constant strain occasions excessive wear on the teeth 9 and 13 of the gears 6 and 12, thereby causing a loss in the efficiency of said gears, and also causing the gears to wear out prematurely, necessitating constant replacement. Therefore, it is proposed to provide means for strengthening the engagement between the gears 8 and 13 and also for reducing, in a large degree, the friction set up by the engaging gears. Said means comprises a pair of supplemental gears 16 and 17 mounted on the driving shaft 6 and positioned adjacent the opposite faces of the driving gear 8. The gears 16 and 17 may be secured to the opposite faces of the gear by means of screws so as to rotate therewith, or be secured against rotation on the shaft 6 by the key 11.

Each of the gears 16 and 17 is formed with a plurality of radially extending fingers 18 provided with concave engaging surfaces, as indicated at 20. The fingers 18 of the gears 16 and 17 are adapted to engage a plurality of equally spaced tubular roller bearings 19 which extend from the opposite faces of the gear 12 transversely of the plane of said gear, and are positioned adjacent the outer periphery of said gear at points equally spaced from the axis thereof, as is clearly shown in Fig. 1. It will be seen that the roller bearings extending from the opposite sides of the gear 12 are disposed in axial alignment forming individual sets. Each set of roller bearings 19 is rotatably mounted on a common pin or stub shaft 21 which extends through said bearings and through an opening formed in the gear 12. At the outer ends thereof the pins 21 are supported by means of semi-circular hollow cup-shaped brackets 22, the straight edges of which face outwardly and are open. The brackets 22 extend outwardly from the opposite sides of the gear 12 and form an integral part thereof in their preferred construction, as is clearly illustrated in Fig. 3. In order that each set of bearings 19 may be rendered readily removable, as for replacement of worn bearings, each of the pins 21 are formed with a head 23 at one end which when the pin is extended through an opening in one of the brackets 22 abuts against the wall of said bracket. At the other end thereof each pin 21 is provided with a threaded reduced end 24 which extends through a reduced opening in the opposed bracket 22. Each pin is secured in position by means of a nut 26 which threadedly engages the threaded end 24 of the said pin.

In operation, the concave faces of the fingers 18 of the gears 16 and 17 engage the rollers 19 extending from the opposite faces of the gear 12 in the manner shown in Fig. 1, and the teeth 9 of the gear 8 engage the teeth 13 of the gear 12. Now when the driving shaft 6 is rotated the motion will be transmitted to the driven shaft 7 causing the same to turn, with a minimum of frictional resistance due to the fact that the rollers 19 will rotate over the concave surfaces 20 of the fingers 18.

It will be seen that in the present construction the gears 8 and 12 may have fewer teeth than is required in the usual gears, and at the same time provide a gear transmission that is equally as strong, due to the fact that the fingers 18 of the gears 16 and 17 engaging the rollers 19 of the gear 12 supplement for the gear teeth dispensed with and with the added feature of reducing to a marked degree the element of friction. It is a well known fact that the friction between two meshed gears of the usual construction is exceptionally large due to the fact that there is at least three points of contact between the teeth in the meshed gears. For this reason it is preferable that the spacing of the teeth in the gears 8 and 12 of the present construction be such that there will be only one point of contact between the teeth of the said gears. It is also desired that the relative spacing of the roller bearings 19 of the gear 12 and the fingers 18 of the gears 16 and 17 be such that two fingers of each of the gears 16 and 17 be in constant contact with two of the rollers 19, making four points of contact between the said members, as is clearly shown in Fig. 1.

Although there is probably a larger number of points of contact in the present construction over the usual gear construction, it will be noted that the friction is less, due to the fact that four of the points of contact are roller bearing contacts, which, of course, provide a minimum of frictional resistance as compared to that of meshed teeth.

From the foregoing, it is thought that the construction, use and many advantages of the herein described gear transmission will be readily understood without further description, and it will also be understood that changes in the form, proportion and minor details of construction may be resorted to without departing from the spirit of the invention, or sacrificing any of the advantages thereof.

What I claim is:—

1. Transmission gearing comprising a gear and pinion in intermeshing relation, said gear having a plurality of equi-angularly spaced pins transversely fixed in the rim thereof and extending from both sides, sleeves rotatably mounted on said pins, retaining members for said sleeves, said pinion being interposed between a pair of toothed members adapted to cooperate with said sleeves.

2. Transmission gearing comprising a gear and pinion in intermeshing relation, a plurality of pins fixed in the rim thereof and extending outwardly from both sides, said pins being equi-angularly spaced, sleeves rotatably mounted on said pins, housing members spanning said pins and adapted to retain said sleeves and support the outer ends of said pins, toothed members in fixed relation and mounted on opposite sides of said pinion adapted to cooperate with said sleeves.

3. Transmission gearing comprising a gear and pinion in intermeshing relation, said gear having cast integral with the rim thereof a plurality of equi-angularly spaced semi-circular housings on each side, equi-distant from the axis, pins extending through said housings and rim and sleeves rotatably mounted on said pins within said housings and toothed members mounted in fixed relation to said pinion and on opposite sides thereof, adapted to cooperate with said sleeves.

4. A transmission gear having cast integral with the rim thereof a plurality of equi-angularly spaced semi-circular housings equi-distant from the axis and parallel therewith, pins detachably secured and extending through said housings and said rim, and rollers mounted on said pins within said housings.

In testimony whereof I have affixed my signature.

PETER ALVENES.